United States Patent [19]

Leimkoetter

[11] Patent Number: 5,708,809
[45] Date of Patent: Jan. 13, 1998

[54] METHOD FOR UPDATING THE PROGRAM STRUCTURE OF A MODULAR COMMUNICATION SYSTEM

[75] Inventor: Ulrich Leimkoetter, Gelsenkirchen, Germany

[73] Assignee: Siemens Aktiengesellschaft, Munich, Germany

[21] Appl. No.: 645,502

[22] Filed: May 14, 1996

[30] Foreign Application Priority Data

May 31, 1995 [DE] Germany .................. 19520030.6

[51] Int. Cl.$^6$ .................. G06F 9/46; G06F 9/45; G06F 9/44
[52] U.S. Cl. .................. 395/704; 395/598; 395/595; 395/710; 395/707
[58] Field of Search .................. 395/500, 651, 395/701, 610, 703, 680, 704, 200.03, 710, 616, 708, 200.1, 595, 568, 707; 340/825.31; 364/DIG. 1, DIG. 2

[56] References Cited

U.S. PATENT DOCUMENTS 4,667,290  5/1987  Goss et al. .................. 395/707
5,511,167  4/1996  Kawano et al. .................. 395/200.03
5,603,020  2/1997  Hashimoto et al. .................. 395/616

FOREIGN PATENT DOCUMENTS 0 347 644 B1  12/1989  European Pat. Off. .

*Primary Examiner*—Daniel H. Pan
*Attorney, Agent, or Firm*—Hill, Steadman & Simpson

[57] ABSTRACT

In the method for updating the program structure of a modular communication system composed of computer-controlled assemblies connected via a common bus, the updating of the program structure given a commissioning and when changing the configuration of a communication system is automatically implemented, that is, without operating personnel. This is effected in that, given a commissioning or a configuration modification, the assembly having the respectively most current program is identified, this program is communicated to the other assemblies and is incorporated into the function execution of the respective assembly. The updating ensues independently of whether assemblies that are already present or newly added assemblies contain the most current programs.

20 Claims, 3 Drawing Sheets

Operation with previous programs APS | Transmission of the most current program APS | Copying of previous programs APS Switching to intermediate memory | Erasing □ active programs

METHOD FOR UPDATING THE PROGRAM STRUCTURE OF A MODULAR COMMUNICATION SYSTEM

BACKGROUND OF THE INVENTION

The present invention is directed to a method for updating the program structure of a modular communication system composed of computer-controlled assemblies connected via a common bus, whereby one of the computer-controlled assemblies is defined as a main assembly and every computer-controlled assembly has programmable program memories available thereto.

Communication systems are structured for setting up and clearing down communication connections from and to communication terminal equipment and further serve to support additional performance features before, during or after a communication connection. These communication systems, which are usually program controlled, are connectable to other communication systems via public or private networks. European Letters Patent 0 347 644 discloses such a communication system.

Communication systems are increasingly modularly constructed in order to be flexibly adaptable to various use environments. The assemblies connected via a common bus in accord with the modular concept are thereby at least partly identical, that is, a quantitative expansion of specific functions such as, for example, a plurality of switchable communication terminal equipment can be undertaken by adding additional assemblies.

One or more programs that, for example, have components for commissioning the assembly and for the control of the functions of the assembly as well as application-specific components are utilized on each assembly in such a communication system. These programs are stored in programmable memories of the assembly and, together with the at least one processor assembly allocated to the respective assembly, effect the predetermined function sequence of the assembly.

In the prior art the loading or, respectively, storing of the programs in the programmable memories of the assembly must ensue on all assemblies before or during a commissioning of the communication system. Given a reequipping of the communication system with an additional assembly or given replacement of an assembly, this assembly also had to be previously loaded with programs.

Compatibility problems between the programs utilized on a newly added assembly and the programs already utilized on the other assemblies can occur under certain circumstances due to the differing current status of stored and newly loaded programs. For eliminating the compatibility problems, the loading of the most current program had to manually initiated for the various assemblies in order to replace the programs.

SUMMARY OF THE INVENTION

It is an object of the present invention to simplify the updating of the program structure, particularly given a commissioning and when modifying the configuration of a communication system.

In general terms the present invention is a method for updating the program structure of a modular communication system composed of computer-controlled assemblies connected via a common bus. One of the computer-controlled assemblies is defined as a main assembly and every computer-controlled assembly has programmable program memories available thereto. A system image of the communication system is generated on each assembly by an exchange of program-oriented and circuit-oriented messages between the assemblies under the control of the main assembly and is respectively stored in a system list. A respective assembly, that contains the respectively most current program, is identified and defined as the main assembly using the system list for identical programs respectively indicated in the system list. The most current program is communicated to at least one assembly by the assembly respectively identified as main assembly, the communicated, most current program is incorporated into the function execution of the respective assembly.

An important advantage of the inventive method is in the immediate initiation and automation of the updating of the program structure on the assemblies of a communication system. As a result thereof, no operating personnel are needed for the implementation of the maintenance of the programs. The exchange of program-oriented and circuit-oriented messages between assemblies is initiated by a main assembly after the commissioning of the communication system or after a modification of the configuration of the communication system.

The program structure in the assemblies of the communication system is updated regardless of whether all assemblies have the most current programs in a commissioning or a configuration modification or whether assemblies that are already present or have been newly added contain the most current programs. This automation eliminates considerable expense in preparing for the commissioning of the communication system since only one assembly need have the most current programs available to it, and since the most current programs are automatically communicated to the other assemblies.

The initial outlay is also reduced when changing the configuration of the communication system since the programs need not already be stored on the assembly when retrofitting or when replacing assemblies. In the present invention the most current programs are communicated to the assemblies from the identical assemblies that are already present.

The most current programs can also be communicated to all other assemblies when retrofitting or when replacing assemblies when the most current programs are stored on the added assembly. Potential compatibility problems are thus avoided.

The inventive method is advantageously developed in that a communication manager is allocated to every assembly for the control of the message exchange and for the transmission or, respectively, reception of programs, and the respectively most current program is communicated via a common bus. The communication manager is stored resident on every assembly and controls the communication of the respective assembly with the other assemblies. The communication of the respectively most current programs is controlled by the communication managers of different assemblies successively defined as the main assembly when the respectively most current programs are not stored on a single assembly. This means that the definition of the main assembly and the communication of the programs can advantageously ensue until a complete updating of the program structure or every assembly has been achieved.

According to another advantageous development, the main assembly is defined by a priority predetermined in circuit-oriented terms when the communication system is commissioned or the respectively most current program is stored in a plurality of assemblies. The inventive method can thus be initiated even when no assembly has hitherto been defined as a main assembly during the course of the previous operation of the communication system. There is no one-to-one correspondence of the allocation between the most current program and an assembly.

In case of a commissioning, a functional program system is generated after the conclusion of the transmission of at least one most current program. It is generated by integration of the at least one most current program that has been communicated into a program-oriented overall system of the respective assembly and an initialization of data bases allocated to the respective assembly. This enables a modular structure of the program system that, advantageously, need only be generated in the corresponding assembly.

In order to allow potentially newly added performance features to take immediate effect, an updating of the respective assembly with data bases allocated to previously updated programs is implemented after the transmission of the most current program for adaptation to a change in configuration. Existing data can thus be transferred and an updating during operation is achieved without restricting the function execution of the assembly. It is thereby advantageous that the incorporation of the communicated, most current program ensues by replacing at least one program previously incorporated in the function execution of the assembly. Program versions are usually upwardly compatible, so that more current versions can completely replace previous program versions and memory space is also saved be removing the previously utilized programs. To that end, intermediate memories in which the communicated, most current program is stored and to which an at least partial switch is undertaken for incorporating the communicated, most current program are allocated to the assemblies.

For generating a system image of the communication system on every assembly, the circuit-oriented and program-oriented messages advantageously contain information about the priority determined in circuit-oriented terms, about the switching technology and about programs on the respective assembly. Preferably, the information about the programs contain a program identity number that indicates the type and current status of the respective program. The equivalence and current status of the programs can be unambiguously identified on the basis of this program identity number.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
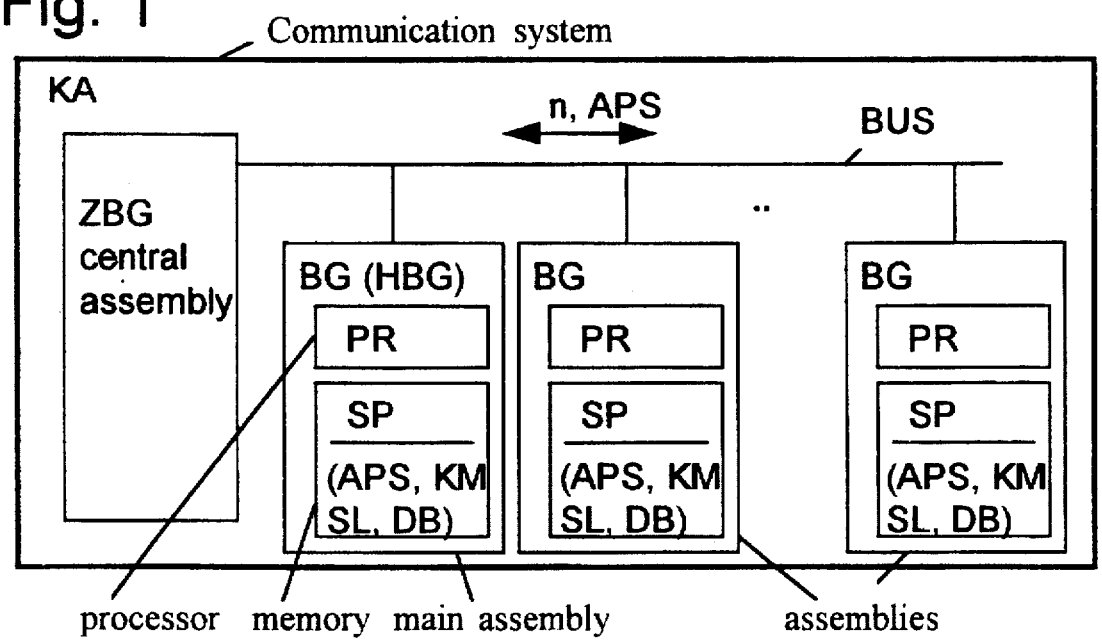
FIG. 1 depicts a communication system for the implementation of the inventive method.

The communication system KA shown in FIG. 1 has, for example, three assemblies BG and a central assembly ZBG that are connected to one another via a common bus BUS. The central assembly ZBG creates the connection of the communication system KA to a public network and also serves for the control and maintenance of the communication system KA. One of the three assemblies BG is defined as main assembly HBG and controls the message and program exchange on the common bus BUS. Every assembly BG can function as the main assembly HBG. The main assembly HBG is defined in circuit-oriented terms given a commissioning or a resetting of the function execution of the communication system KA since every assembly BG is structurally secured in a plugin location and a priority is assigned to this plugin location. Thus, in this case, the assembly BG in the plugin location having the highest priority receives the function of a main assembly HBG. A new main assembly HBG can be defined in program-oriented terms independently of the plugin location during further function execution.

Each assembly BG contains a processor PR that controls the functioning of the assembly BG in collaboration with a program memory SP and further function elements that are not shown. Programs APS (placed in brackets) that comprise components for the commissioning of the assembly BG, for the control of the functions of the assembly BG as well as user-specific components, a communication manager KM for controlling the message and program exchange on the common bus BUS, a system list SL having a circuit-oriented and program-oriented system image of the communication system KA and databases DB are deposited in the memory SP.

The inventive method can be initiated for commissioning the communication system KA or given a modification of the configuration of the communication system KA.

The commissioning case is described with reference to FIG. 2. The commissioning can be externally initiated, for example by switching the communication system KA on, or internally by a resetting or equivalent measures. A circuit-oriented priority is unambiguously defined on the basis of the plugin location address of each assembly BG and, thus, a main assembly HBG is defined for controlling the message and program exchange on the common bus BUS.

This main assembly HBG initiates the exchange of program-oriented and circuit-oriented messages n between the assemblies BG. This message exchange serves the purpose of generating a system image of the communication system KV on each assembly BG. The system image is respectively stored in a system list SL. A time grid is prescribed for the message exchange, in accord wherewith a transmission time is allocated to every plugin location and, consequently, to every assembly BG, this corresponding for the other assemblies BG to a reception time for the program-oriented and circuit-oriented messages n belonging to the transmitting assembly BG. These program-oriented and circuit-oriented messages n contain information about the priority of the transmitting assembly BG predetermined in circuit-oriented terms, about the circuit technology of the transmitting assembly BG and about the programs APS used on the transmitting assembly BG. In particular, the programs APS are identified by a program identity number, whereby this program identity number enables an unambiguous allocation with respect to the type and current status of the respective program. When, for example, three programs APS are in use on an assembly BG, they can be identified, for example, by the program identity numbers A2, B3 and C1. A,B or, respectively, C thereby indicates the type of program APS as module of the program structure of the assembly BG and the numerals 2,3 or, respectively, 1 are a particular directed to the current status of the respective program APS. The current status increases with increasing numeral. Therefore a program APS having, for example, the program identity number A3 can replace a program APS having the program identity number A2. A system image of the communication system KA is stored in the system list SL of each and every assembly BG as a result of the message exchange.

In the selected example, the assemblies BG are identical in circuit-oriented terms, and the communication manager KM is stored in the memory SP. However, only the main assembly HBG has the programs APS available to it for forming a most current, functional program structure. Also, in the example, the assembly BG that contains the respectively most current program APS is thus the prior main assembly HBG. This can be identified on the basis of the system image in every assembly BG. Thus as sole assembly BG, the prior main assembly HBG also assumes the status of a main assembly HBG. This occurs at a point in time determined by the time grid. The priority access to the common bus BUS that distinguishes the main assembly HBG is thus preserved for the prior main assembly HBG.

Subsequently, the main assembly HBG transmits all programs APS to the remaining assemblies BG at defined points in time and these programs APS are loaded into the program memories SP of the other assemblies BG and stored by the communication managers KM of the other assemblies BG. After communication of the programs APS, an initialization of the program structure of the corresponding assembly BG occurs in the other assemblies BG by incorporating all communicated programs ABS and, potentially, an establishment of the databases DB. The communication system KA is thus placed in operation in full scope.

In the transmission of the programs APS, a bit test for testing for transmission errors is undertaken at the respectively receiving assembly BG for each communicated program APS or a part thereof. When an error is found, the faulty program segment is deleted and the transmission is repeated. A bit test is also implemented for the totality of transmitted programs APS before the initialization of the program structure. A renewed transmission attempt is implemented given identified errors.

Figure 3:
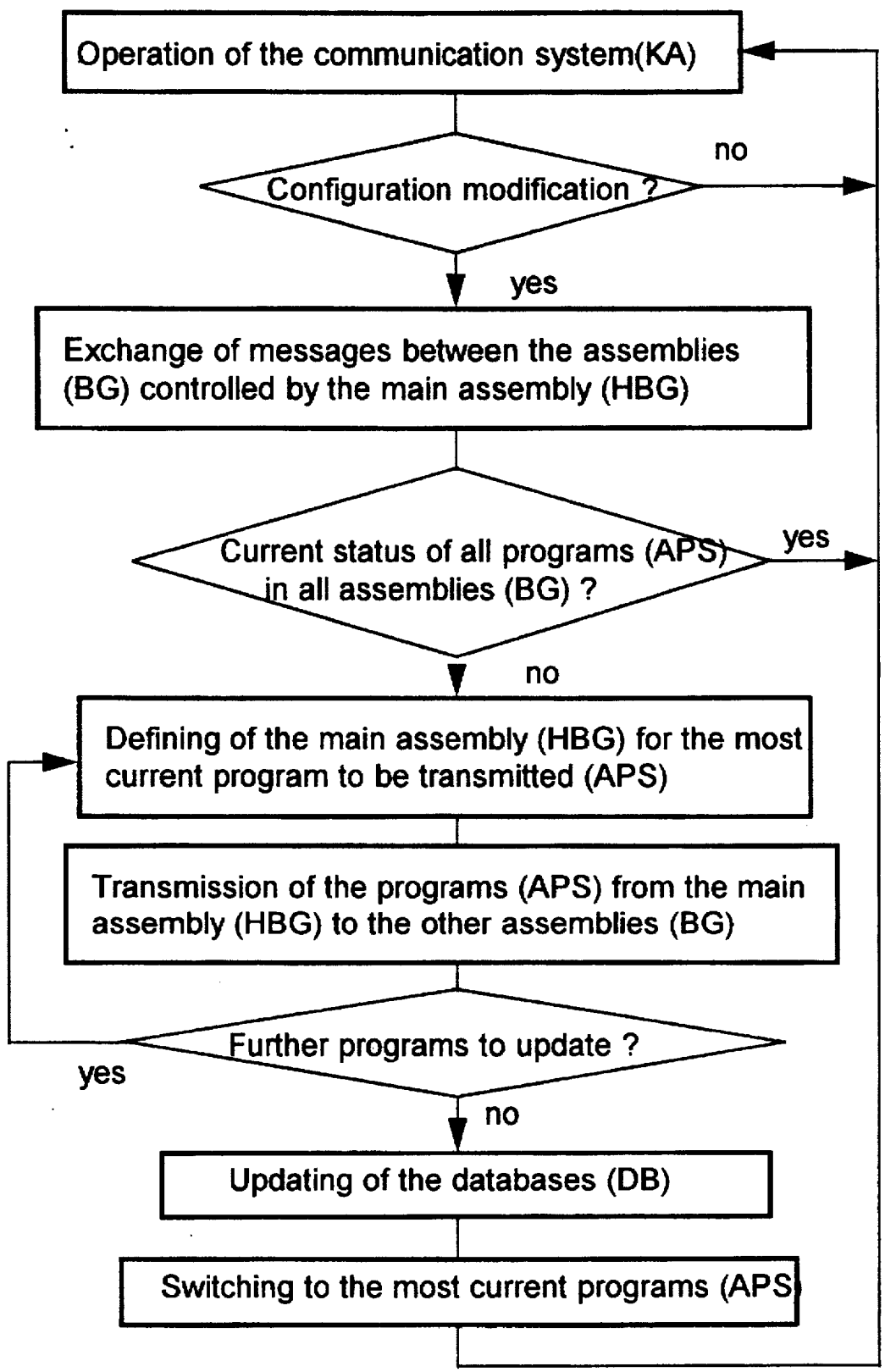
FIG. 3 depicts the schematic execution of the inventive method for adapting the program structure after a configuration modification of the communication system.

FIG. 3 schematically shows the execution of the inventive method following a modification of the configuration of the communication system KA. The modification of the configuration of the communication system KA can occur by adding an assembly BY, by replacing an assembly BG or by removing an assembly BG. The communication system KA is in operation at the beginning of the inventive method, whereby a test for configuration modifications is implemented at regular intervals by the main assembly HBG. This test, for example, can ensue on the basis of an interrupt signal when an assembly BG is added. However, it is also conceivable to utilize the program-oriented and circuit-oriented message exchange between the assemblies BG for the test for configuration modifications. When no configuration modification is found, the function execution in the communication system KA is continued unmodified.

Figure 2:
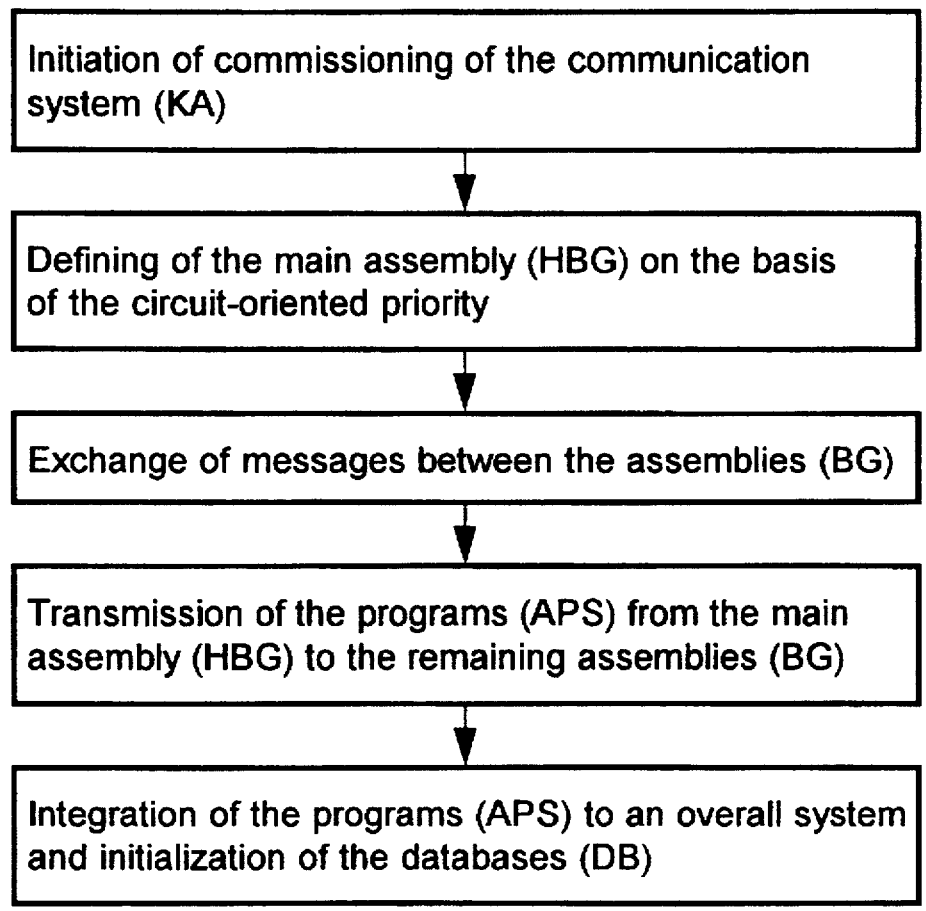
FIG. 2 is a flow chart of the inventive method for the commissioning of the communication system.

When a configuration modification is found, the message exchange of program-oriented and circuit-oriented messages n between the assemblies BG recited in the description of FIG. 2 is controlled by the main assembly HBG already defined in the operation of the communication system KA. As a result of this message exchange, information the priority determined in circuited-oriented terms, about the circuit technology and about the programs APS on the newly added assembly BG are then also present in the system list SL of each and every assembly BG. A test is carried out by the communication manager KM of each and every assembly BG to determine whether a program APS available to it, that is whether a program APS stored in the program memory SP, can replace a program APS stored on another assembly BG. This comparison can be implemented on the basis of the program identity number. When this test shows that the respectively most current program APS is present in all assemblies BG, and, thus, none of the assemblies BG requests the status of a main assembly HBG for the communication of the at least one most current program APS, operation of the communication system KA is continued.

When, for example, the newly added assembly BG contains a program APS having the program identity number (A3), whereby the other assemblies BG contain the program APS with the program identity number (A2), the newly added assembly BG requests the status of a main assembly HBG. This status is accorded it by the previous main assembly HBG, whereupon the newly added assembly BG (as main assembly HBG) controls the further method execution. In the manner described above, the new main assembly HBG communicates the program APS (A3) to the other assemblies BG via the common bus BUS.

When a plurality of programs APS is to be updated, the sequence of the communication is determined by the circuit-oriented priority of the assembly BG containing the respectively most current program APS. The method thus repeats with the same or with a different assembly BG as the main assembly HBG. After the end of the updating of the program structure on all assemblies BG, an updating of the databases DB is initiated by the communication manager KM of each assembly BG for adaptation to what may be modified performance features of the programs APS. With the existence of updated databases DB, a switch can be made to this program structure in assemblies BG having an updated program structure without having to interrupt the operation of this assembly BG. After switching to the updated program structure, the operation of the communication system KA is continued with the most recently defined assembly BG as the main assembly HBG.

Figure 4:
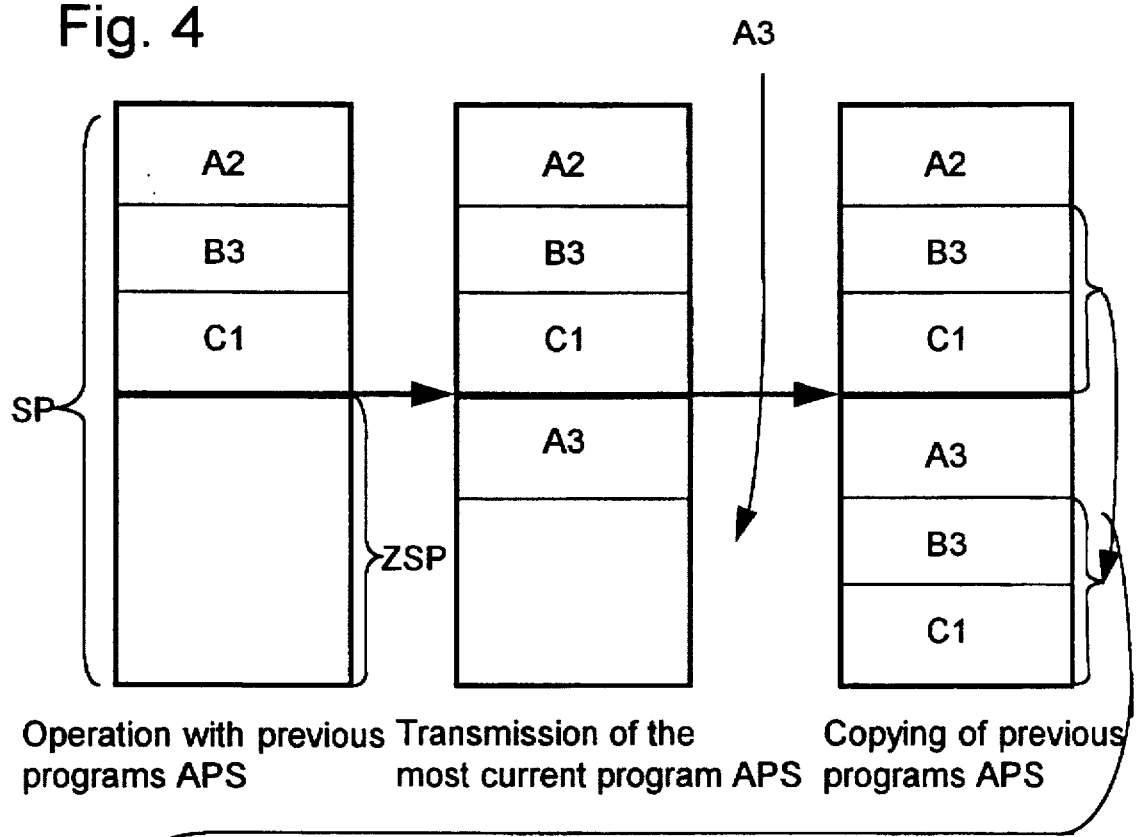
FIG. 4 depicts the replacement of the previously employed programs by the communicated programs in the communication system.
Figure 4:
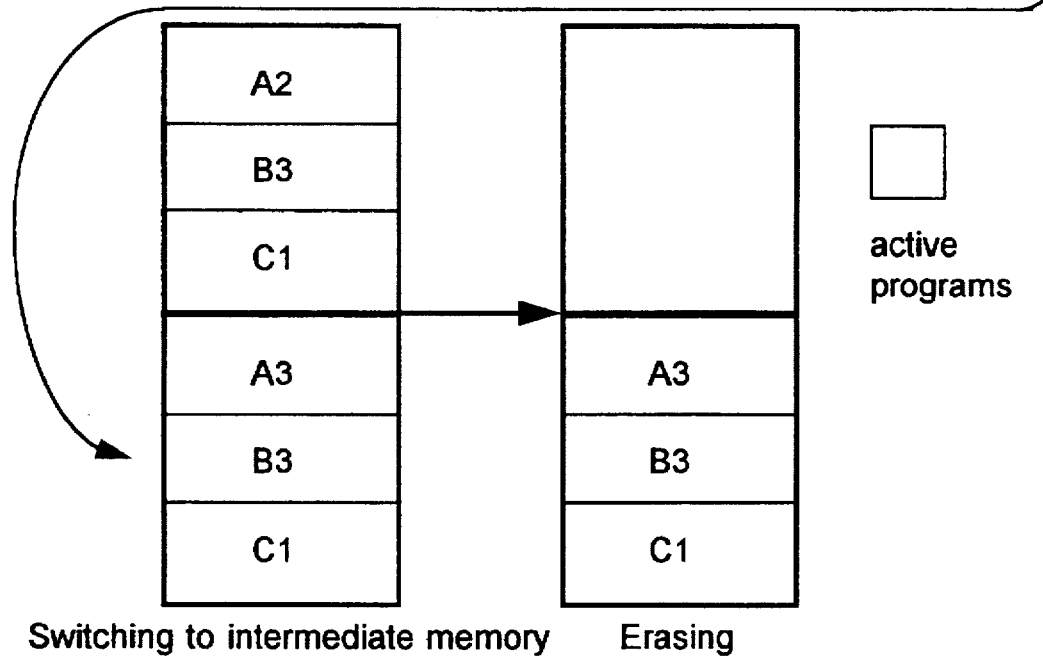

The replacement of the programs APS in an assembly BG given ongoing operation by the most current programs APS is explained with reference to FIG. 4. An assembly BG has at least one program memory SP available to it with a memory area that allows at least the double storing of the programs APS replaceable in the sense of the inventive method. The assembly works with the programs APS and three programs APS (A2,B3,C1) are assumed as an example.

Before the transmission of the most current programs APS, tests are carried out to determine whether an intermediate memory ZSP, adequate for the transmission, is present in the assemblies BG and whether its memory area is not write-protected. When these tests are successful, an inquiry is made to determine which areas in the intermediate memory ZSP are available. In addition, there is the possibility of copying the subscriber data, that is, the data contained in the databases DB, as an additional security measure. .

After these preparatory measures for program transmission have been made, the exemplary program APS (A3) is communicated from the main assembly HBG to the other assemblies BG and is stored therein in the intermediate memory ZSP. The transmitted program APS (A3) is supplemented by copying with the programs APS (B3,C1) in the intermediate memory ZSP already being employed in order to generate a completely functional program system in the assembly BG. The most current programs APS can, for example, respectively replace a plurality of programs previously employed or a plurality of the most current, transmitted programs APS can be necessary for replacing a previously utilized program APS. The design of new, current program versions APS is not restricted by a prior division of the functions of the assembly BG onto the individual, previously utilized programs APS. The specialization or, respectively, generalization of the programs APS for various circuit-oriented configurations of assemblies BG is respectively possible.

When the bit test for testing the program structure is successful, then the measures for switching to the updated program structure are initiated. The switching can occur both immediately as well as delayed. Before switching to the updated program structure, this is initialized. Given occurring errors, a return to the previously utilized program structure can be made at any time. After successful switching, the replaced program APS (A2) can at least be partially deleted so that adequate memory capacity is again available for future updates.

During the transmission of the programs APS and during the switching, errors and method-specific protocol messages are generated and stored in a protocol memory whose content can be interrogated via the communication manager KM and transmitted to other assemblies BG or to the central assembly ZBG.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for updating a program structure of a modular communication system having computer-controlled assemblies connected via a common bus, one of the computer-controlled assemblies having defined as a main assembly and every computer-controlled assembly respectively having programmable program memories available thereto, comprising the steps of:

generating a system image of the communication system on each assembly of the computer-controlled assemblies by an exchange of program-oriented and circuit-oriented messages between the assemblies of the computer-controlled assemblies under control of the main assembly and storing the system image in a system list;

identifying and defining a respective assembly of the computer-controlled assemblies, that contains the respectively most current program, as the main assembly using the system list for identical programs respectively indicated in the system list;

communicating the most current program to at least one assembly of the computer-controlled assemblies by the respective assembly that is identified as the main assembly; and incorporating the communicated, most current program into function execution of the at least one assembly.

2. The method according to claim 1, wherein the exchange of program-oriented and circuit-oriented messages between the assemblies is initiated by the main assembly after commissioning of the communication system or after a modification of a configuration of the communication system.

3. The method according to claim 1, wherein the most current program is communicated via the common bus, and wherein a respective communication manager is allocated to every assembly for control of message exchange and for transmission and reception of programs.

4. The method according to claim 3, wherein the communication of the respectively most current program is controlled by the communication managers of different assemblies of the computer-controlled assemblies that are successively defined as a main assembly when respectively most current programs are not stored on a single assembly.

5. The method according to claim 1, wherein the incorporation of the communicated, most current program ensues by replacing at least one program previously incorporated in a function execution of the respective assembly.

6. The method according to claim 1, wherein the main assembly is defined by a priority predetermined in circuit-oriented terms when the communication system is commissioned or when the respectively most current program is stored in a plurality of assemblies.

7. The method according to claim 1, wherein, for commissioning after conclusion of a transmission of at least one most current program, an integration of the at least one most current program that has been communicated into a program-oriented overall system of the respective assembly and an initialization of data bases allocated to the respective assembly ensue.

8. The method according to claim 1, wherein an updating of the respective assembly with data bases allocated to previously updated programs ensues after transmission of the most current program for adaptation to a change in configuration.

9. The method according to claim 1, wherein, for updating programs during operation of the respective assembly, an intermediate memory in which the communicated, most current program is stored and to which an at least partial switch is made for incorporating the communicated, most current program is allocated to the respective assembly.

10. The method according to claim 1, wherein communication of the most current program ensues in parallel to predetermined assemblies of the computer-controlled assemblies.

11. The method according to claim 1, wherein communication of the most current program ensues serially to predetermined assemblies of the computer-controlled assemblies.

12. The method according to claim 1, wherein the communication of the most current program ensues only to at least one assembly of the computer-controlled assemblies without the most current program.

13. The method according to claim 1, wherein for imaging the communication system on every assembly of the computer-controlled assemblies, the circuit-oriented and program-oriented messages has information about priority determined in circuit-oriented terms, about circuit technology and about programs on the respective assembly.

14. The method according to claim 1, wherein equivalence and current status of programs of the computer-controlled assemblies is identified based on a program identity number, the program identity number indicating a type and current status of a respective program of the computer-controlled assemblies.

15. A method for updating a program structure of a modular communication system having computer-controlled assemblies connected via a common bus, one of the computer-controlled assemblies having defined as a main assembly and every computer-controlled assembly respectively having programmable program memories available thereto, comprising the steps of:

allocating a respective communication manager to every assembly of the computer-controlled assemblies for control of message exchange and for transmission and reception of programs;

generating a system image of the communication system on each assembly of the computer-controlled assemblies by an exchange of program-oriented and circuit-oriented messages between the assemblies of the computer-controlled assemblies under control of the main assembly and storing the system image in a system list;

identifying and defining a respective assembly of the computer-controlled assemblies, that contains the respectively most current program, as the main assembly using the system list for identical programs respectively indicated in the system list;

communicating via the common bus the most current program to at least one assembly of the computer-controlled assemblies by the respective assembly that is identified as the main assembly, the communication of the respectively most current program being controlled by the communication managers of different assemblies of the computer-controlled assemblies that are successively defined as a main assembly when respectively most current programs are not stored on a single assembly; and incorporating the communicated, most current program into function execution of the at least one assembly.

16. The method according to claim 15, wherein the incorporation of the communicated, most current program ensues by replacing at least one program previously incorporated in a function execution of the respective assembly.

17. The method according to claim 15, wherein, for commissioning after conclusion of a transmission of at least one most current program, an integration of the at least one most current program that has been communicated into a program-oriented overall system of the respective assembly and an initialization of data bases allocated to the respective assembly ensue.

18. A method for updating a program structure of a modular communication system having computer-controlled assemblies connected via a common bus, one of the computer-controlled assemblies having defined as a main assembly and every computer-controlled assembly respectively having programmable program memories available thereto, comprising the steps of:

generating a system image of the communication system on each assembly of the computer-controlled assemblies by an exchange of program-oriented and circuit-oriented messages between the assemblies of the computer-controlled assemblies under control of the main assembly and storing the system image in a system list;

identifying and defining a respective assembly of the computer-controlled assemblies, that contains the respectively most current program, as the main assembly using the system list for identical programs respectively indicated in the system list;

communicating the most current program to at least one assembly of the computer-controlled assemblies by the respective assembly that is identified as the main assembly; and storing, for updating programs during operation of the respective assembly, the communicated, most current program in an intermediate memory of the respective assembly an at least partial switch being made for incorporating the communicated, most current program into function execution of the respective assembly.

19. The method according to claim 18, wherein the most current program is communicated via the common bus, and wherein a respective communication manager is allocated to every assembly for control of message exchange and for transmission and reception of programs.

20. The method according to claim 18, wherein for imaging the communication system on every assembly of the computer-controlled assemblies, the circuit-oriented and program-oriented messages has information about priority determined in circuit-oriented terms, about circuit technology and about programs on the respective assembly.

* * * * *